(12) United States Patent
Nothum

(10) Patent No.: US 12,715,017 B2
(45) Date of Patent: Aug. 25, 2026

(54) WET COLLECTION OF COATING EXHAUST FROM FOOD-PRODUCT COATING APPARATUS

(71) Applicant: Ryan D. Nothum, Springfield, MO (US)

(72) Inventor: Ryan D. Nothum, Springfield, MO (US)

( * ) Notice: Subject to any disclaimer, the term of this patent is extended or adjusted under 35 U.S.C. 154(b) by 429 days.

(21) Appl. No.: 18/522,862

(22) Filed: Nov. 29, 2023

(65) Prior Publication Data

US 2024/0198378 A1 Jun. 20, 2024

Related U.S. Application Data

(60) Provisional application No. 63/385,284, filed on Nov. 29, 2022.

(51) Int. Cl.
*B05C 11/10* (2006.01)
*A23P 20/12* (2016.01)

(52) U.S. Cl.
CPC .......... *B05C 11/1039* (2013.01); *A23P 20/12* (2016.08)

(58) Field of Classification Search
CPC ............................ A23P 20/12; B05C 11/1039
See application file for complete search history.

(56) References Cited

U.S. PATENT DOCUMENTS

| | | | | |
|---|---|---|---|---|
| 3,703,382 A * | 11/1972 | Harkey | A23P 20/12 118/16 |
| 8,096,259 B1 | 1/2012 | Nothum, Jr. et al. | B05C 19/04 |
| 9,687,018 B1 | 6/2017 | Nothum, Jr. et al. | A23P 1/08 |
| 2002/0144651 A1* | 10/2002 | Kuenen | A23P 20/12 118/308 |
| 2008/0014310 A1* | 1/2008 | Dargusch | A23P 20/12 426/295 |

FOREIGN PATENT DOCUMENTS

WO WO-2019125168 A1 * 6/2019 ............. B05C 19/06

* cited by examiner

*Primary Examiner* — Benjamin L Osterhout
(74) *Attorney, Agent, or Firm* — Jonathan A. Bay

(57) ABSTRACT

A wet collection apparatus is provided for collecting dry coating material exhaust from food-product coating apparatus for dusting or coating food product pieces (eg., chicken tenders) in automatic and/or mechanized food-process lines. There is a water vessel with a bottom wall, surrounding sidewalls, an open top, a removable closure for the open top, an exhaust blower mounted on or pneumatically-coupled to the vessel or closure, and a vacuum line extending between and pneumatically-coupled to both the food-product coating apparatus and one of the vessel or closure. The water vessel being characterized by a generally hollow interior defining a process chamber. Then there are a plurality of channel-dividing partitions mounted in the hollow interior of the water vessel forcing the flow of exhaust air through the process chamber to submerge and re-emerge into and out of the pool of water in a chutes and ladder fashion.

20 Claims, 11 Drawing Sheets

20
40
28
46
29
44
30
32
22
24
26
34

40
64
46
62
60
66
4
4
68
56
54
58
50, 52

40
70
58
54
42
50,56
58

66
62
62
92
86
96
82
94
73
96
84
77
96
76
80
74
78
90,100
88
88

72
71
104
102

72
71
10-10

106
90
88
88

WET COLLECTION OF COATING EXHAUST FROM FOOD-PRODUCT COATING APPARATUS

CROSS-REFERENCE TO PROVISIONAL APPLICATION(S)

This application claims the benefit of U.S. Provisional Application No. 63/385,284, filed Nov. 29, 2022. The foregoing patent disclosure is incorporated herein by this reference thereto.

BACKGROUND AND SUMMARY OF THE INVENTION

The invention generally relates to automatic and/or mechanized food-process line equipment and, more particularly, to wet collection of coating exhaust from food-product coating apparatus. Generally, the coating material is going to be dry particulate (eg., flour and spices) rather than wet coating material (eg., batter).

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

Figure 2:
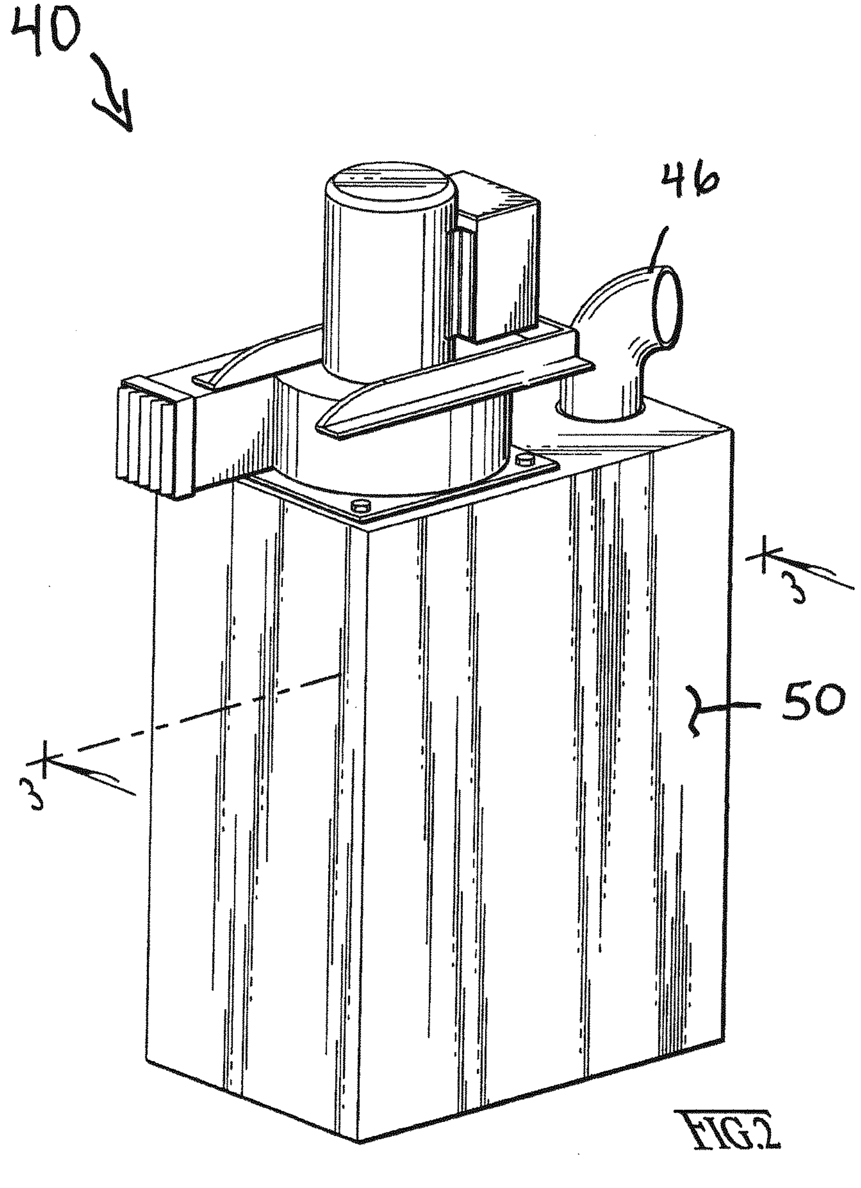
Figure 3:
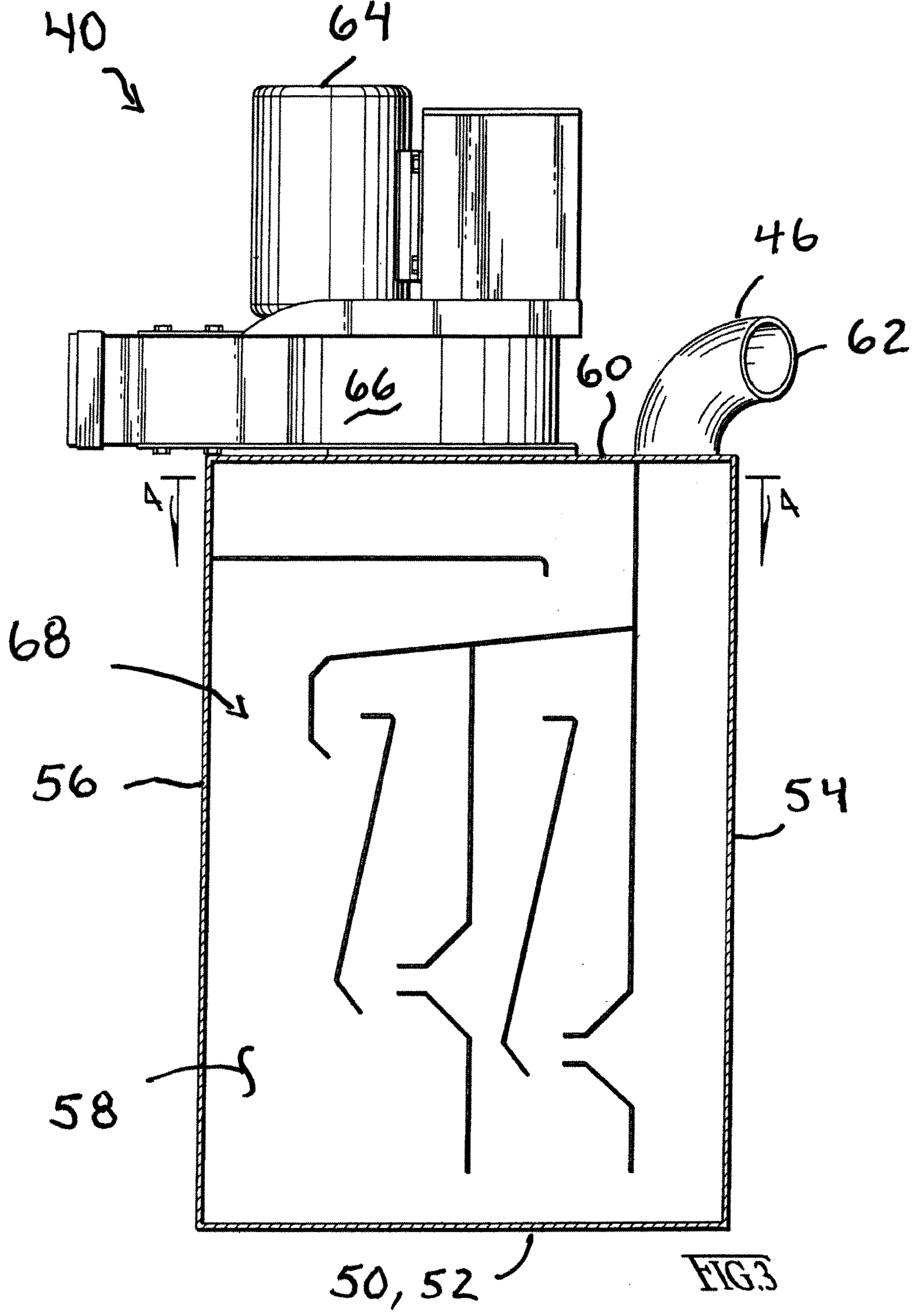
Figure 4:
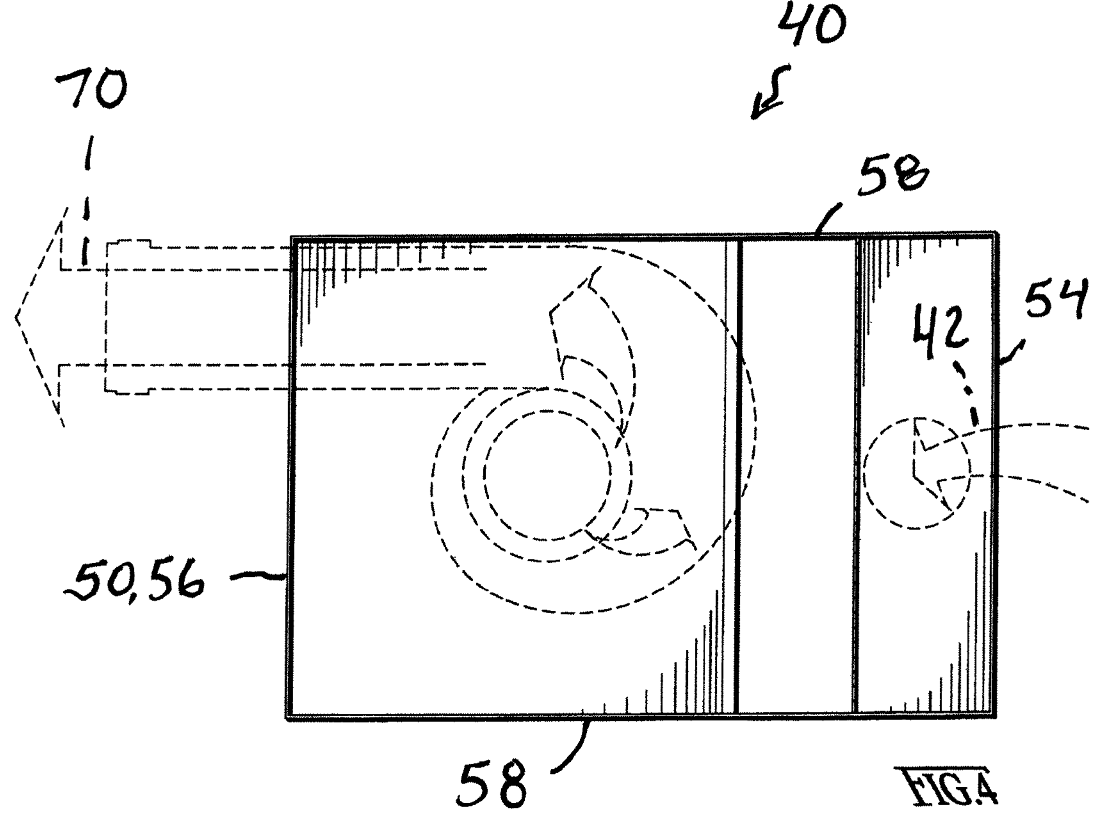
Figure 5:
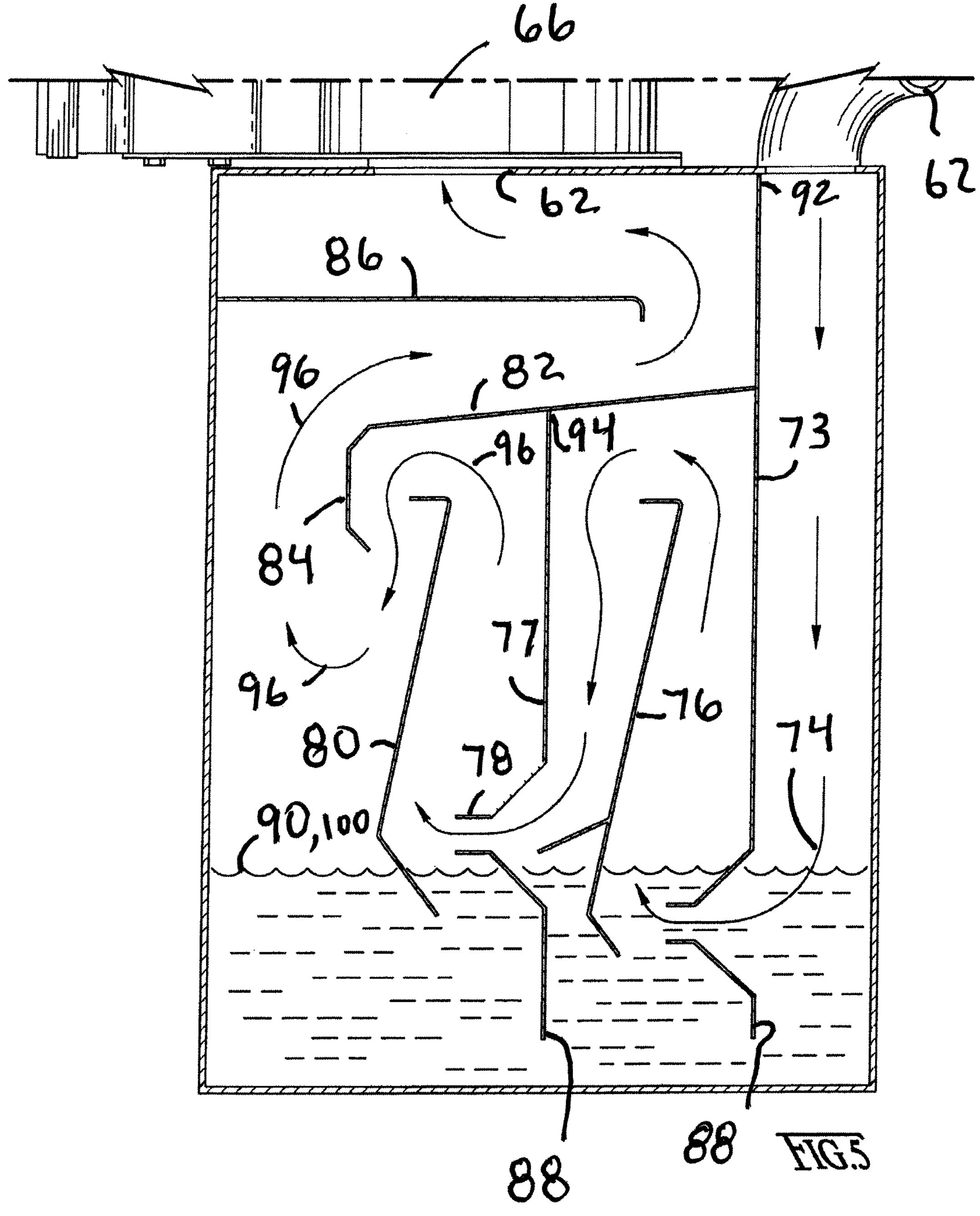
Figure 6:
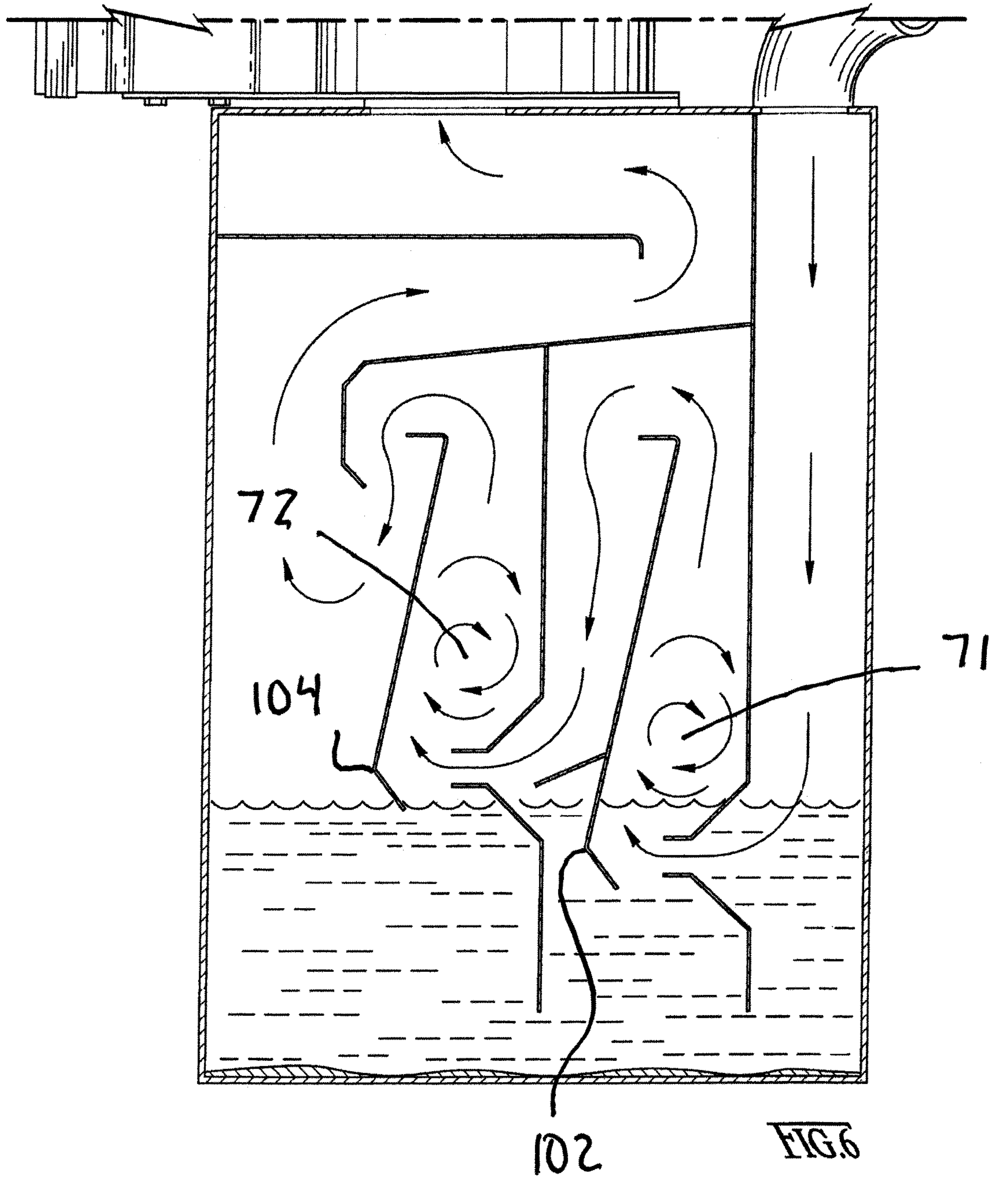
Figure 7:
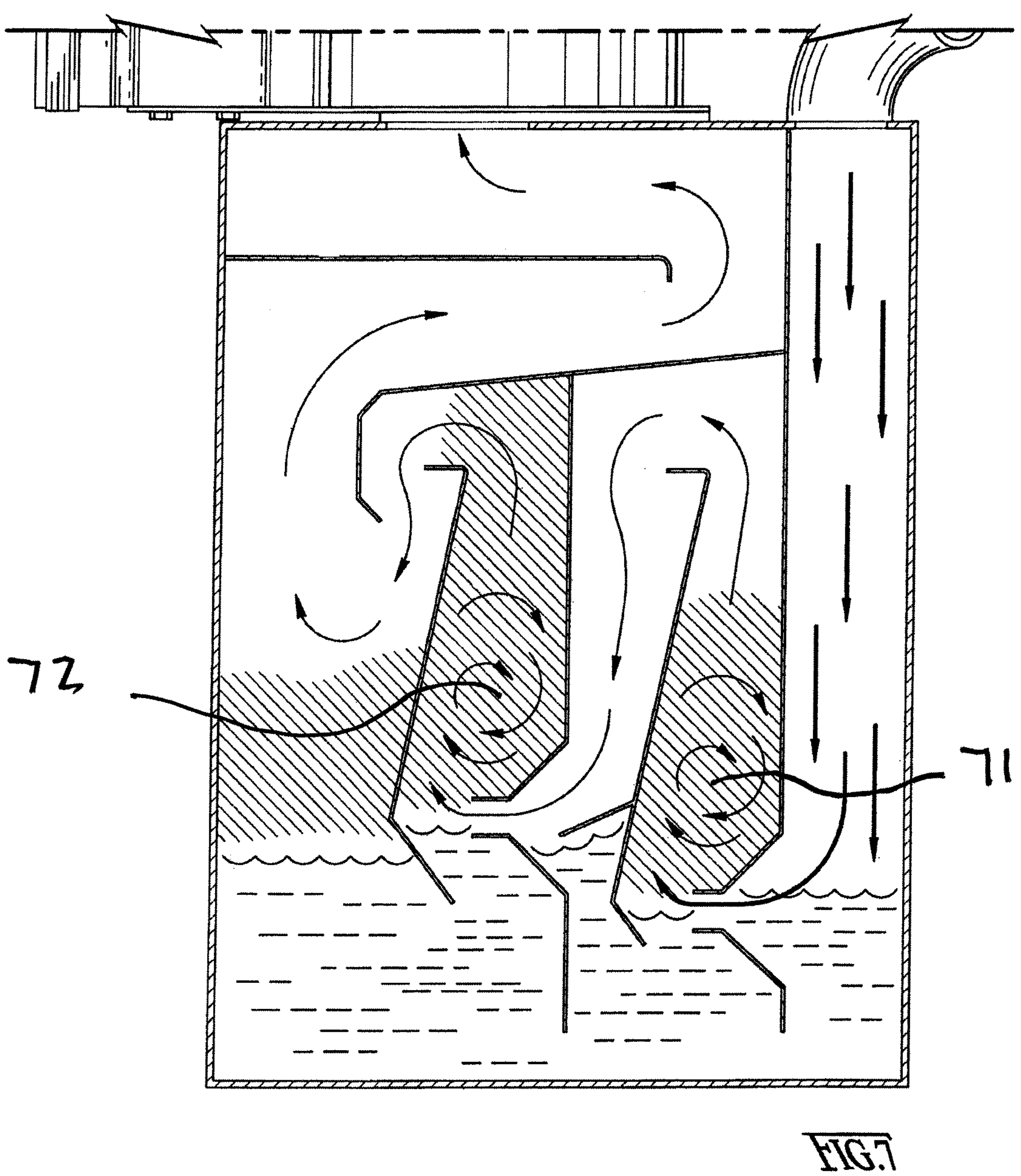
Figure 8:
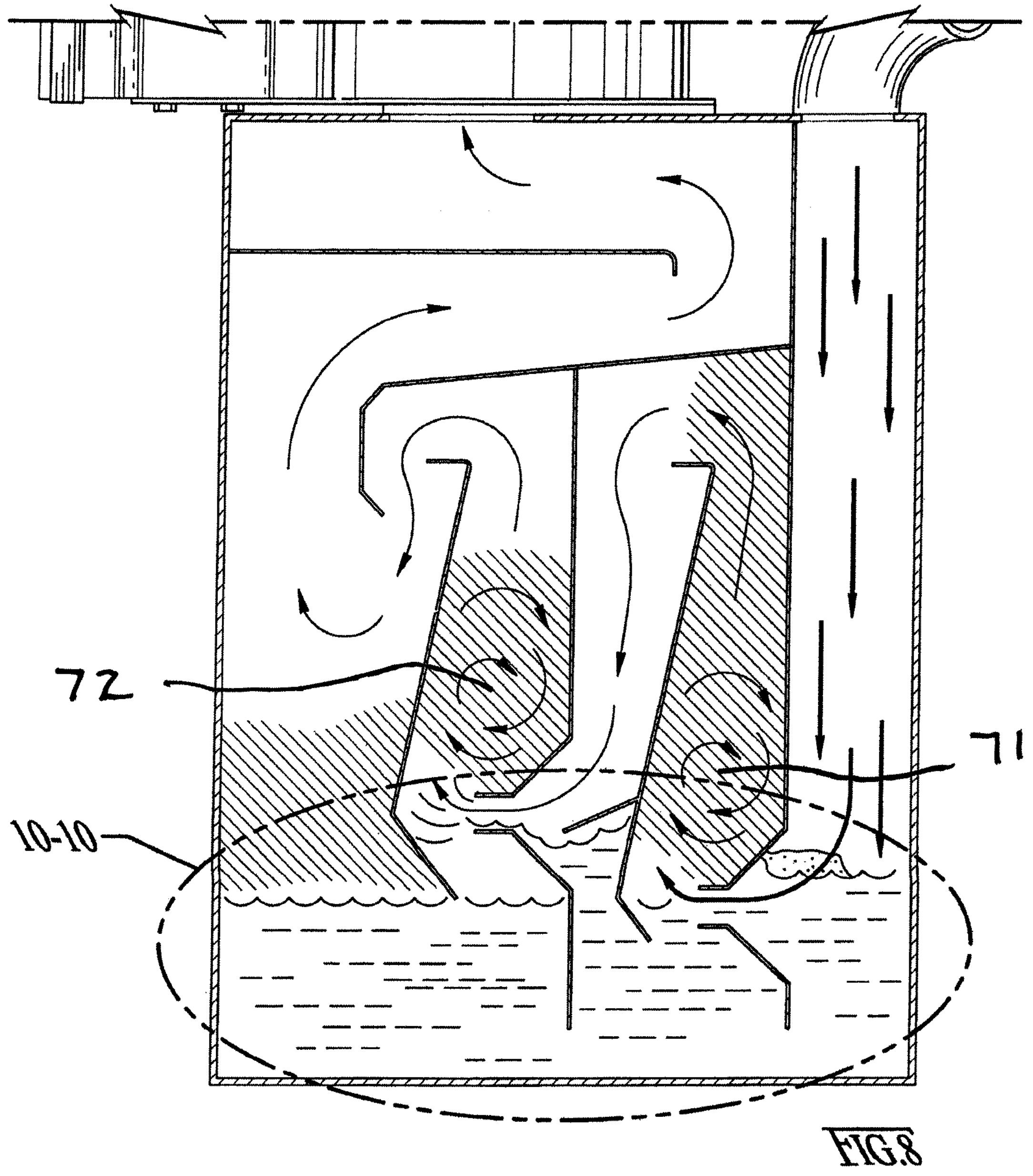
Figure 9:
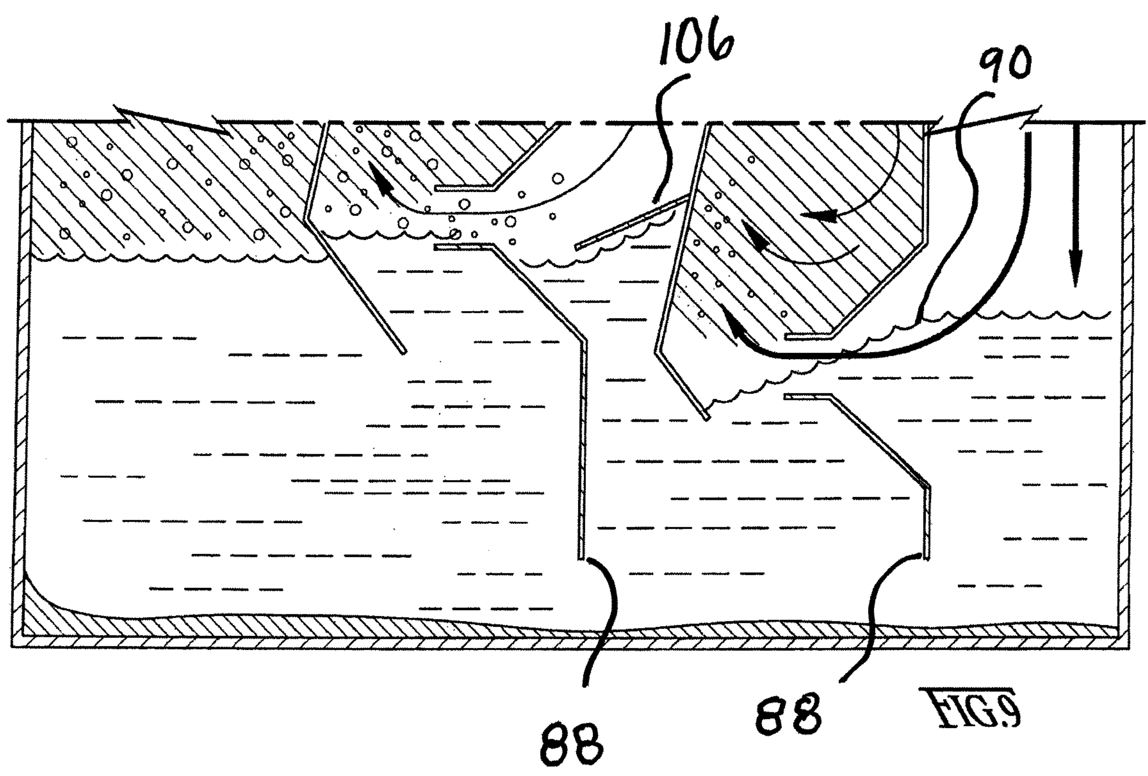
Figure 10:
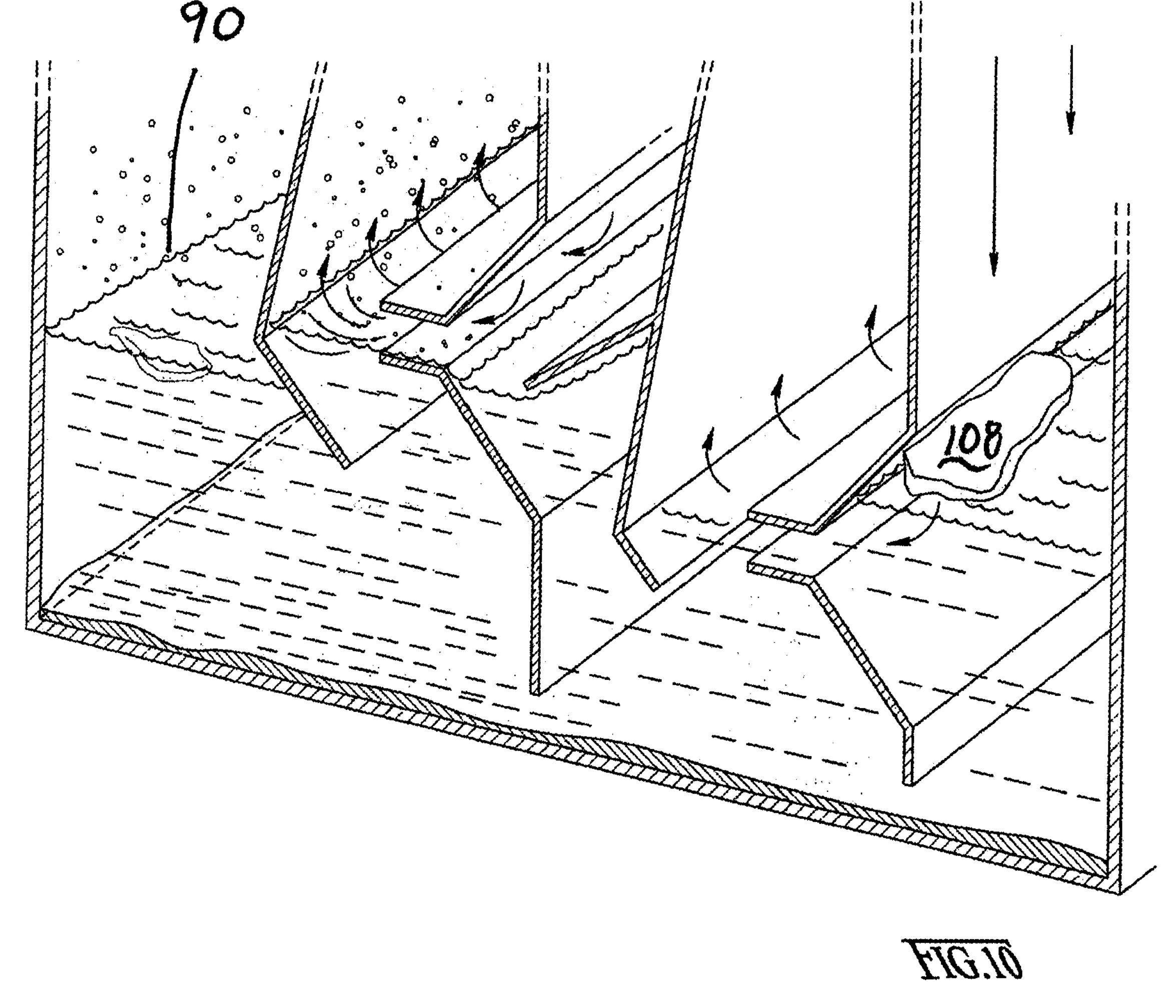
Figure 11:
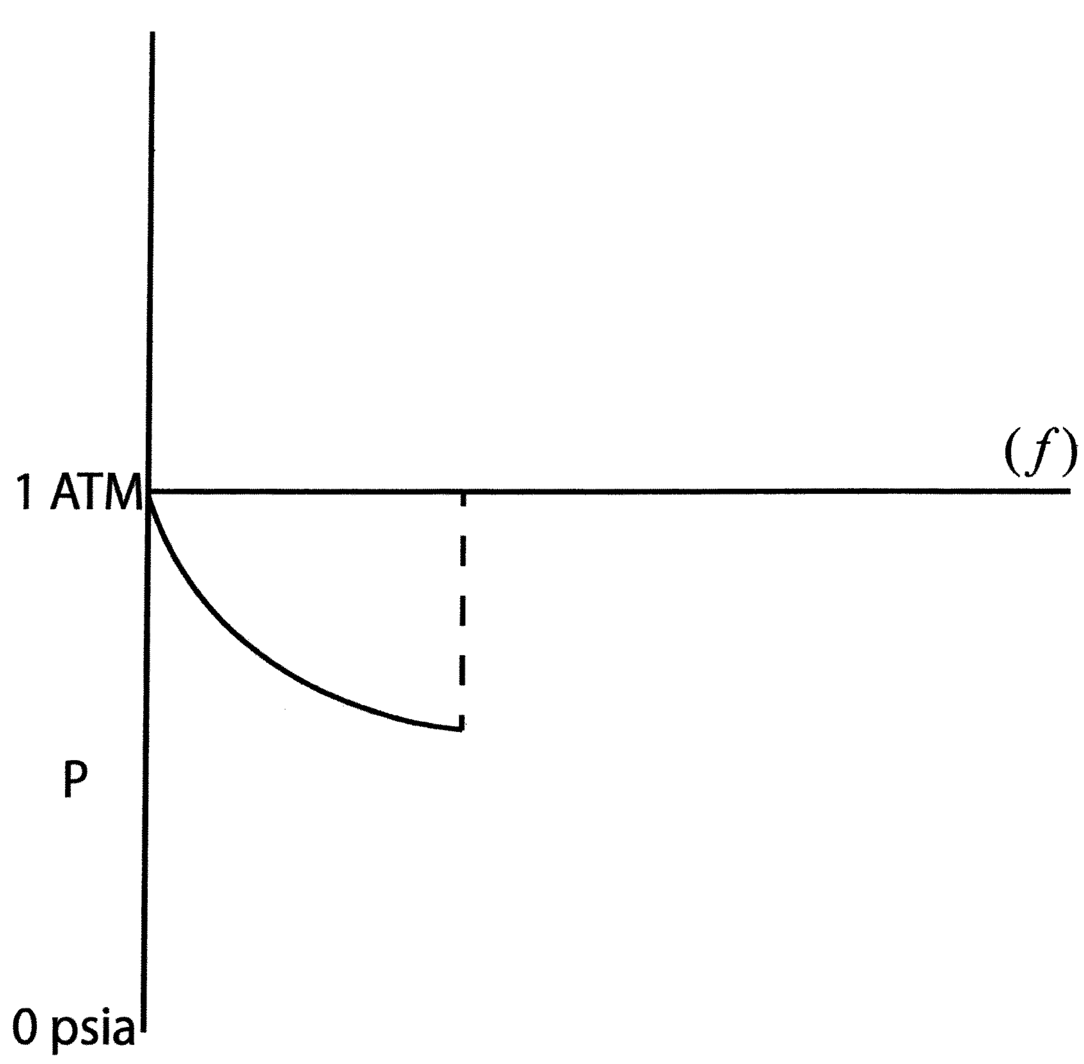

- in the foreground, the food-product coating apparatus is attended to by a hopper for replenishing the dry particulate coating material as the exiting food product pieces on the discharge conveyors continually carry away and deplete/drain the food-product coating apparatus of its original charge of coating material, and
- in the background, the food-product coating apparatus is attended by a wet collection apparatus in accordance with the invention for collecting coating material exhaust from said food-product coating apparatus;

FIG. 2 is an enlarged-scale perspective view of the wet collection apparatus in accordance with the invention, in isolation;

FIG. 3 is cross-sectional view taken along line 3-3 in FIG. 2 showing an enclosed steel-plate cabinet defining a process chamber in accordance with the invention sub-divided into a series of side-by-side generally vertical channels by means of a series of steel-plate channel-dividing partitions;

FIG. 4 is cross-sectional view taken along line 4-4 in FIG. 3;

FIG. 5 is an enlarged-scale sectional view comparable to FIG. 3 except showing the process chamber containing a shallow pool of water at rest before switching the electric-motor driven high-powered exhaust blower (suction fan or vacuum pump) to ON, wherein the arrows show the course of the exhaust flow through the process chamber and as winding around channel-dividing partitions in a chutes and ladder fashion;

FIG. 6 is a sectional view comparable to FIG. 5 except showing the process chamber moments after switching the exhaust blower to ON, the arrows not only showing the course of the exhaust flow through the process chamber but also showing the development of eddies;

FIG. 7 is a sectional view comparable to FIG. 6 except showing the process chamber in an exemplary state where the eddies have transformed into a full churn after the exhaust blower has been switched to ON for several minutes;

FIG. 8 is a sectional view comparable to FIG. 7 except showing the process chamber in an alternate exemplary state of full churn after the exhaust blower has been switched to ON for several minutes, wherein the states in the process chamber oscillate between one extreme (eg., FIG. 7) and another (eg., FIG. 8) wherein one of the nozzles is flooded with water until a back pressure of air builds up and bursts through in a bubbly foggy jet of a mixture of air, silty water droplets and dust;

FIG. 9 is an enlarged-scale detail view of the lower third of FIG. 7;

FIG. 10 is an enlarged-scale perspective view of detail 10-10 in FIG. 8 that shows that, while some fraction of the particulate might sink in the pool to form a bottom layer of sediment, other fractions of the particulate form floating rafts in the first channel of the processor where the original inflow of exhaust air from the food-product coating apparatus is received, wherein the pool is relatively calmer here and less subject to the oscillations induced by the first nozzles; and FIG. 11 is a generalized curve showing pressure (P) on the Y-axis representing pressure under the hood of the food-product coating apparatus, and flowrate (f) on the X-axis and representing exhaust blower flowrate/output to atmosphere.

DETAILED DESCRIPTION OF THE PREFERRED EMBODIMENTS

Figure 1:
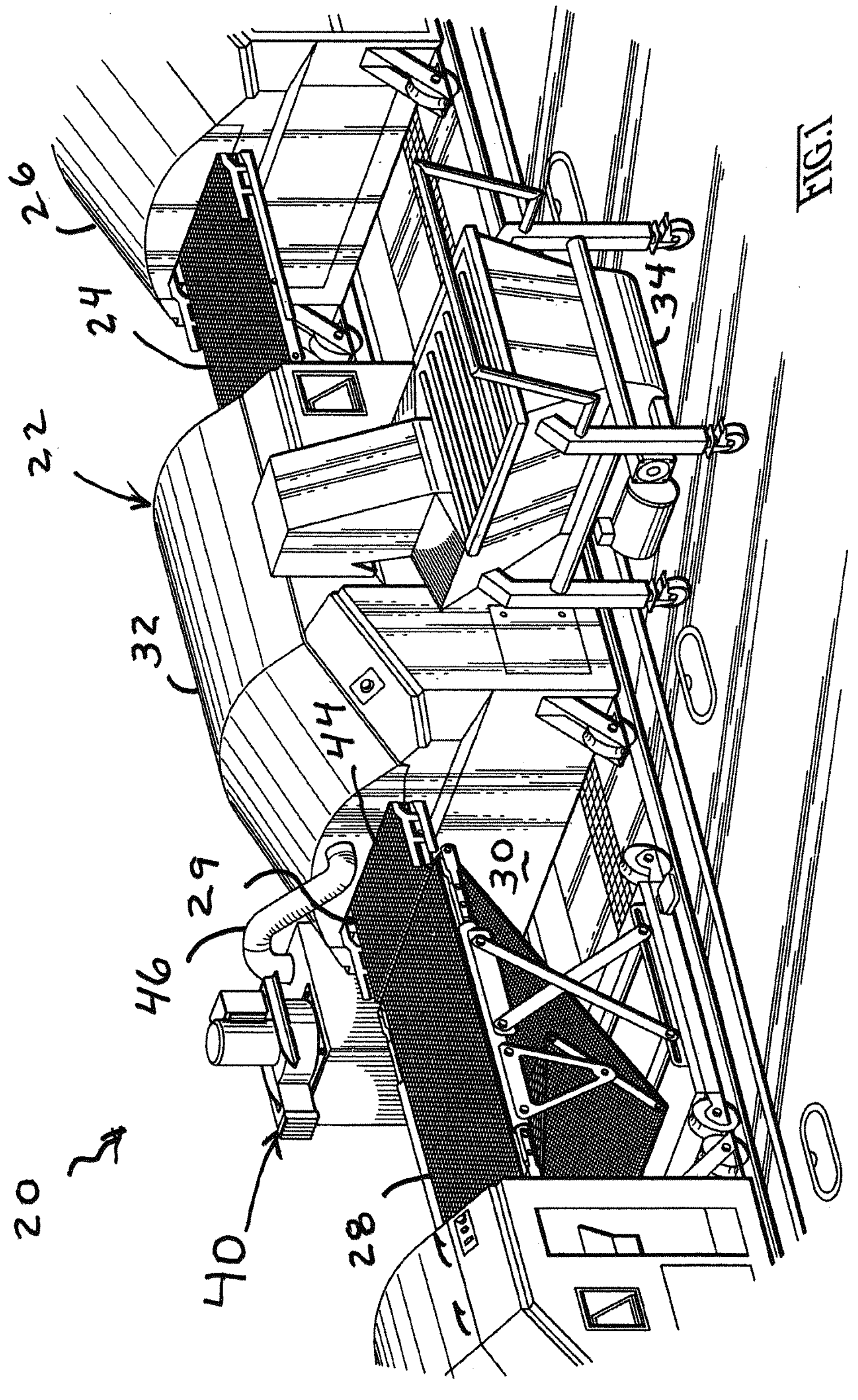
FIG. 1 is a perspective view of portions of an automatic and/or mechanized food-process line comprising a line of food processing equipment including, in which in focus in the center is a food-product coating apparatus for dusting or coating food product pieces (such as and without limitation chicken tenders):—

FIG. 1 show portions of an automatic and/or mechanized food-process line 20 comprising a line of food processing equipment including, in the center, a food-product coating apparatus 22 for dusting or coating food product pieces (not shown) such as and without limitation chicken tenders.

Examples of food-product coating apparatus might include for example and without limitation what is disclosed in U.S. Pat. No. 9,687,018—Nothum, Jr., et al., "Food process-line coating apparatus with exchangeable substitution or elimination of accessories of the tumbling and/or flipping nature." Or, for another example and without limitation, what is disclosed in U.S. Pat. No. 8,096,259—Nothum, Jr., et al., "Gutters and plows for coating-material recirculation in food-coating apparatus."

Food product pieces (eg., chicken nuggets) are typically serially conveyed on endless wire-mesh conveyor belts through a series of food-product line processing equipment where at least one food process line operation is performed, such as dry coat, wet coat, dry coat again, par-fry and so on to packaging and freezing.

The food-product coating apparatus 22 is flanked between the discharge conveyor 24 of an immediately upline machine 26 and an immediately downline transfer conveyor 28. The food-product coating apparatus 22 has a steel-plate cabinet 30 covered by a hood 32. The food-product coating apparatus 22 is attended to in part by a hopper 34 for replenishing the food-product coating apparatus 22 with dry particulate coating material (indicated as arrows as more particularly described below in connection with any of FIGS. 5-10). That is because the exiting food product pieces on the discharge conveyors 28 and 29 continually carry away and drain/deplete said food-product coating apparatus 22 of its original charge of coating material.

The food-product coating apparatus 22 is attended to in other part by a wet collection apparatus 40 in accordance with the invention for collecting coating material exhaust (eg., 42 in FIG. 4) from food-product coating apparatus 22. Generally, the coating material is going to be dry particulate (eg., flour and spices) rather than wet coating material (eg., batter).

Food-product coating apparatus 22 in automatic and/or mechanized food-process lines typically receive a constant inflow of food product pieces (eg., chicken nuggets, and again food product pieces are not shown) and coat them by various processes with a dust or powdery coating (eg., flour and spices and so on). Such coating apparatus 22 must also receive a periodic replenishment of the coating material (eg., fresh flour, with or without an admixture of spices or other additions).

Some of these 'various processes' for coating the food product pieces include without limitation drum tumbling in a horizontal drum (not shown). Inside the drum, the food product pieces and coating material are being tumbled such that the atmosphere inside the drum (ie., food-product coating apparatus 22) is cloudy with a wafting, swirling fraction of the coating material. In other words, there is a dust storm churning inside the drum. The designed-for outflow from the drum is coated food-product pieces. The unwanted outflow might also be escaped atmosphere from inside the drum (ie., food-product coating apparatus 22), including the suspended fraction of coating material.

It is possible to contain the escape of suspended coating material if the inflow and outflow apertures (eg., outflow aperture 44) for the intake and discharge of food product pieces are low-height slits (eg., 44) just tall enough for passage of the conveyor belts (eg., see outflow conveyor belt 29 in FIG. 1) and food product pieces (not shown), and then also if in combination, a negative pressure is maintained inside the drum (ie., food-product coating apparatus 22). That way, the inflow and outflow channels/apertures (eg., 44) are always inhaling external air (which is presumably free of or at least relatively free of suspensions).

To do so requires a vacuum line 46 that draws a cloudy exhaust mixture from the drum (ie., food-product coating apparatus 22). The vacuum line 46 runs from a connection in the hood of the food-product coating apparatus 22 to a connection with the wet collection apparatus 40 in accordance with the invention.

FIG. 2 shows the wet collection apparatus 40 in isolation. The wet collection apparatus 40 comprises a water-tight stainless-steel plate cabinet 50 (vessel) with a rectangular bottom wall 52, four rectangular sidewalls (54,56,58) and an open top covered by a removable lid or closure 60. The cabinet 50 has a generally hollow interior with a bottom wall 52 (floor plan) that is about four feet by three feet rectangular, and sidewalls (54,56,58) that are about four feet high. The cabinet 50 is essentially a water vessel for the shallow pool of water. However, it is alternately preferred to have an outer cabinet (outer cabinet not shown) that is not required to be watertight, which houses the water vessel 50 and closure 60 which are cooperatively watertight, except for the pneumatic connections (eg., 62).

The lid or closure 60 is provided with a termination end-point connection 62 for the vacuum line 46 from the hood 32 of the food-process coating apparatus 22, as shown on the upper right side of the lid or closure 60. The rest of the real estate on top of the lid or closure 60 is taken up by a combination set of a powerful electric drive motor 64 and a driven exhaust blower fan 66. The blower fan 66 suctions (or draws) exhaust air 42 (eg., a coating material-laden mixture) from inside the cabinet 30 of the food-product coating apparatus 22. Again, this exhaust flow 42 (ie., exhaust from food-product coating apparatus 22) is a mixed flow of air and suspended coating material from out of the food-product coating apparatus 22.

At best, the exhaust blower 66 induces a 'rough' vacuum inside the food-product coating apparatus 22 (not even a half atmosphere). But at least the exhaust blower 66 draws a sufficient negative pressure such that the food-product coating apparatus 22 'inhales' fresh air through the narrow slit-formed inlet for the infeed conveyor (neither inlet nor infeed conveyor in view) and slit-formed outlet 44 for the discharge conveyor 29. That way, the dust storm inside the food-product coating apparatus 22 is fairly contained within its cabinet 30 and hood 32.

FIGS. 3 through 8 are similar cross-sectional views taken along line 3-3 in FIG. 2 and showing the inside of the cabinet 50, which comprises a process chamber 68. FIG. 4 is a top plan view of the lid or closure 60, and showing the relative inflow of exhaust gas 42 from the food-product coating apparatus 22 as drawn into the wet collection apparatus 40 through the terminal-fitting connection 62 for the vacuum line 46. FIG. 4 also shows the ultimate discharge of the relatively filtered or 'scrubbed' outlet air 70 into the local atmosphere by the powerful exhaust blower 66, also mounted on top of the lid or closure 60.

FIG. 3 shows the interior of the process chamber 68 is divided up into a series of flow channels a well as cells 71-72 by means of a series of steel-plate channel-dividing partitions (73,76,77,80,82,84,86).

The terms channels is intended to describe regions bounded by not only the channel-dividing partitions (73,76,77,80,82,84,86):—but also by the sidewalls (54,56,58), bottom wall 52 and closure 60 as well.

The terms cell 71,72 is intended to describe certain flow phenomena:—in particular, induced swirls (eddies) that rotate in place like a spinning log chucked in a lathe.

FIG. 3 shows that the cabinet 50 has an inflow-side sidewall 54 and a spaced away discharge-side sidewall 56 cooperatively flanking:

the bottom wall 52, and two endwalls 58 (only one in view in FIG. 3, but see FIG. 4).

The channel-dividing partitions (73,76,77,80,82,84,86) extend into and out of the view of FIG. 3 from one endwall 58 to the opposite spaced away endwall 58, and are welded or otherwise fixed in place. Again, the channel-dividing partitions (73,76,77,80,82,84,86) run the whole length between endwall 58 to endwall 58, and again see FIG. 4.

To stay in FIG. 3, the flow-bounding structures which characterize the process chamber 68 include, starting at the far right and proceeding clockwise:— the inflow-side sidewall 54, the bottom wall 52, a first nozzle-formed partition 73, a first Z-formed backstop partition 76, a second nozzle-formed partition 77, a second Z-formed backstop partition 80,

- a roof 82 enclosing the head space above the first Z-formed backstop partition 76 between the first nozzle-formed partition 73 and the top edge of the second nozzle-formed partition 77,
- an eave 84 continuation of the roof 82 projecting over the second Z-formed backstop partition 80,
- the discharge-side sidewall 56,
- a horizontal shelf 86 projecting inwards from the discharge-side sidewall 56 and spaced over the roof 82 and its eave 84 continuation as well as space below the closure 60, and
- the closure 60.

The first and second nozzle-formed partitions 73 and 77 are 'daylighted' at their bottom edges 88 in that they have bottom edges 88 that are spaced by a common-height gap from the bottom wall 52. To look at FIG. 5 (among others), the water of the pool of water 90 is free to migrate underneath these bottom edges 88 however it wants to.

The first nozzle-formed partition 73 has a top edge 92 common with the elevation of the closure 60. The second nozzle-formed partition 77 has a top edge 94 which is joined to the roof 82. The eave 84 does not reach the discharge-side sidewall 56 but instead leaves a flow channel 96 therebetween.

The first and second nozzle-formed partitions 73 and 77 are actually defined by upper and lower spaced panels respectively. The upper and lower panels at where they are spaced apart and bent (creased) consequently form respective first and second funnel-shaped nozzles 74 and 78 respectively. FIGS. 5 and 6 show the preferred fill line 100 for the water pool at rest. The first nozzle-formed partition 73 forms its respective nozzle 74 at an elevation that is submerged below the static pool fill line 100. The second nozzle-formed partition 77 forms it respective nozzle 78 at an elevation that is emergent and dry over the static pool fill line 100.

The first and second Z-formed backstop partitions 76 and 80 have respective upper ledges that are disposed at about a common elevation with each other.

However, the first Z-formed backstop partition 76 has a central diagonal panel declining at an outward angle (eg., 7 o'clock on an imaginary clock dial in FIG. 3) and transitioning at a crease 102 into a lower diagonal panel declining at an inward angle (eg., 5 o'clock on an imaginary clock dial in FIG. 3):—wherein the elevation of this first crease 102 is centered on a horizontal plane of symmetry with the first funnel-shaped nozzle 74.

Correspondingly, the second Z-formed backstop partition 80 has a central diagonal panel declining at an outward angle (eg., 7 o'clock on an imaginary clock dial in FIG. 3) and transitioning at a crease 104 into a lower diagonal panel declining at an inward angle (eg., 5 o'clock on an imaginary clock dial in FIG. 3):—wherein the elevation of this second crease 104 is centered on a horizontal plane of symmetry with the second funnel-shaped nozzle 78.

In other words, the first and second creases 102 and 104 are at different elevations with respect to each other but are aligned at elevations in like proportions with respect to their respective first and second nozzles 74 and 78.

The creases 102 and 104 thus formed sideways-V shaped 'backstop partitions' (eg., as shown in FIG. 3, "less than" sign shaped, or "<"). To turn to FIG. 6, these backstop partitions 76 and 80 induce flow phenomena cells 71 and 72 that, as previously characterized, form swirling storms that rotate in place on a horizontal axis like a spinning log chucked in a lathe. These swirling storms 71 and 72 are referred to by applicant by their main contribution:—applicant refers to them as "water/dust mixing cells 72."

FIGS. 5-10 show that the backside of the first Z-formed backstop partition 76 has attached to it a declining vane 106 aimed for deflecting flow into the second nozzle 78. That is, flow enters the first nozzle 74 as in the manner of a side outlet in a T-shaped pipe fitting. However, flow enters the second nozzle 78 with the aid of being deflected therein by the well-aimed vane 106. FIG. 5 shows better that the flow pattern undertakes a serpentine path in the process chamber 68 in accordance with the boundaries set by:—

- the inflow-side sidewall 54,
- the bottom wall 52,
- the first nozzle-formed partition 73 and its nozzle 74,
- the first Z-formed backstop partition 76,
- the second nozzle-formed partition 77 and its nozzle 78,
- the second Z-formed backstop partition 80,
- the roof 82 enclosing a head space above first Z-formed backstop partition 73,
- its eave 84 continuation projecting over second Z-formed backstop partition 77,
- the discharge-side sidewall 56,
- the shelf 86 above the roof 82 and eave 84 continuation but below the closure 60, and
- the closure 60.

The flow direction boundaries direct the flow in this sequence:—

- a pair of down arrows indicate a downflow of exhaust air 42 drawn in from the food-product coating apparatus 22 heading down along the front side of the first nozzle-formed partition 73,
- although indicated as the path being blocked by the water surface of the fill level 100 of the static water pool 90, U-shaped arrow indicates flow through the first nozzle 74 and up the front side of the first Z-formed backstop partition 76,
- from this stage on the flow can be (sediment laden) water, (dust laden) air, or two phase admixtures thereof, and some flow might transit beneath either of the first or second nozzle-formed partitions 76 or 80 (although not shown),
- a pair of arrows cooperatively indicate an inverted U-turn over the top ledge of the first Z-formed backstop partition 76,
- another U-shaped arrow indicates flow through the second nozzle 78 and up the front side of the second Z-formed backstop partition 80,
- a single inverted-U shaped arrow indicates an inverted U-turn over the top ledge of the second Z-formed backstop partition 80,
- a pair of arrows cooperatively indicate an recurve upward back turn around and over the cave 84,
- another pair of arrows cooperatively indicate a recurve upward front turn around and over the shelf 86 and out through the exhaust blower 66.

FIG. 6 shows better where the first and second "water/dust mixing cells" 71 and 72 develop with respect to the first and second nozzles 74 and 78 and the respective first and second backstop partitions 76 and 80 therefor (and their respective crease portions 102 and 104).

Experience shows that the vast majority of the suspended fraction 42 of coating material is caught/collected in the water 90 as sediment. The outflow 70 from the exhaust blower 66 is more or less fresh air.

To turn to FIGS. 7-10, these are black line renditions of actual screen grabs from video taken of an actual proof-ofconcept demonstration machine that had been provided with a transparent sidewall to show the air-water-dust flow patterns in operation.

Unlike what is shown in FIGS. 5 and 6, there is no 'level' water level (eg. 100) as for a static water pool 90.

Without describing FIGS. 7 through 9 in detail, visual observations record that an oscillatory pattern sets up, between one sloshed state and another sloshed state:—and back and forth and so on setting a riotous amount of turbulence. Which is believed to be a beneficial outcome as just promoting more mixing more vigorously.

So FIG. 7 is a general representation of one sloshed state, FIG. 8 the other, and FIG. 9 is an enlarged scale detail view of the lower third or so of FIG. 7.

It is believed the mechanism which is by and large responsible for triggering this oscillation pattern occurs in the first nozzle 74. To recall basic physics, air is compressible, water is incompressible. And it is the compressibility of air which is believed to set up this mechanical-spring like oscillation.

That is, the one state (FIG. 7 or 9) has an air jet blasting through the first nozzle 74. The air expands past the first nozzle 74, and not only expands upwardly, but downwardly too pushing the water 90 level between the first nozzle-formed partition 73 and first Z-formed backstop partition 76 to depress (drop). This causes water levels elsewhere in the process chamber 68 to rise:—notably, along the discharge-side sidewall 56 and under the second nozzle 78.

Then, the weight of the rising water levels starts to slosh the water level in front of the first nozzle 74 to rise until the first nozzle 74 is flooded (eg., FIG. 8). The air jet from the second nozzle 78 is now expanding, and just like the first nozzle 74 in FIG. 7, the jet through the second nozzle 78 not only expands upwardly, but downwardly too pushing the water level between the second nozzle-formed partition 77 and second Z-formed backstop partition 80 to depress (drop). This causes water levels elsewhere in the process chamber 68 to rise, ie., and thereby returning to the state of FIG. 7.

The oscillations are not only visually evident but they also have a fairly steady periodicity.

FIG. 10 shows that some of the dust originally forms floating rafts 108 until those can be broken up and entrained as sediment in the water pool 90.

FIG. 11 is a power curve showing the relation of increase in power to increase in vacuum (drop in pressure to absolute zero pressure). The vacuum levels here aren't very high, and in industry these levels of vacuum are referred to as "rough" vacuum.

More particularly, FIG. 11 shows pressure (P) on the Y-axis as representing pressure under the hood 32 of the food-product coating apparatus 22, and flowrate (f) on the X-axis as representing exhaust blower 66 flowrate/output to atmosphere. The power it takes to increase flowrate (f) is probably exponential to some degree.

What FIG. 11 shows is that, there are diminishing returns for increasing power and increasing flowrate to draw a deeper vacuum. The suction pressure of the exhaust blower 66 will eventually become so great as to suction in pool water 90, which is a shutdown condition indicated by the broken line.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A wet collection apparatus for collecting dry coating material exhaust from food-product coating apparatus for dusting or coating food product pieces with dry coating material in automatic and/or mechanized food-process lines; comprising:

a water vessel with a bottom wall, a surrounding sidewall or sidewalls, and an open top;

a removable closure for the open top;

an exhaust blower mounted on or pneumatically-coupled to the vessel or closure;

a vacuum line extending between and pneumatically-coupled to both the food-product coating apparatus and one of the vessel or closure;

the water vessel being characterized by a generally hollow interior defining a process chamber whereby filled partially with a pool of water; and a plurality of spaced channel-dividing partitions mounted in the hollow interior of the water vessel forcing the flow of exhaust air through the process chamber to submerge and re-emerge into and out of the pool of water while transiting serially past the spaced channel-dividing partitions whereby in a serpentine fashion of submerging and re-emerging.

2. The wet collection apparatus of claim 1 whereby the food product pieces comprise chicken tenders.

3. The wet collection apparatus of claim 1 wherein:

the exhaust blower is mounted on and pneumatically-coupled to the closure.

4. The wet collection apparatus of claim 1 wherein:

the water vessel comprises an inflow-side sidewall spaced apart from a discharge-side sidewall by a pair of endwalls whereby giving the bottom wall a quadrilateral floor plan; and the plurality of channel-dividing partitions span between the endwalls.

5. The wet collection apparatus of claim 4 wherein:

the plurality of channel-dividing partitions comprise, in progression from the inflow-side sidewall to the discharge-side sidewall;

a first nozzle-formed partition conducting a downflow (1) from the vacuum line output that extends between and is pneumatically-coupled to both the food-product coating apparatus and one of the vessel or closure (2) between said first nozzle-formed partition and the inflow-side sidewall;

a first backstop partition;

a second nozzle-formed partition; and a second backstop partition.

6. The wet collection apparatus of claim 5 wherein:

all of the partitions have either bottom edges that are not continuously sealed with the bottom wall or are otherwise apertured close to the bottom wall whereby the pool of water can mix freely between the inflow-side sidewall and the discharge-side sidewall.

7. The wet collection apparatus of claim 5 wherein:

the first and second nozzle-formed partitions are formed with respective first and second nozzles elevationally closer to the bottom wall than the closure;

the pool of water having a fill line at rest; and the first nozzle is elevationally disposed submerged below the at-rest fill line and submerged in the at-rest pool of water.

8. The wet collection apparatus of claim 7 wherein: the first and second backstop partitions have respective creases elevationally located opposite the first and second nozzles respectively, whereby inducing respective mixing cells/eddies (71 and 72) respectively.

9. A wet collection apparatus for collecting dry coating material exhaust from food-product coating apparatus for dusting or coating food product pieces with dry coating material in automatic and/or mechanized food-process lines; comprising:

a water vessel comprising a bottom wall, an inflow-side sidewall spaced apart from a discharge-side sidewall by a pair of endwalls all sealed with the bottom wall and thereby giving the bottom wall a quadrilateral floor plan, and an open top;

a removable closure for the open top;

an exhaust blower mounted on or pneumatically-coupled to the vessel or closure;

a vacuum line extending between and pneumatically-coupled to both the food-product coating apparatus and one of the vessel or closure;

the water vessel being characterized by a generally hollow interior defining a process chamber whereby filled partially with a pool of water; and a plurality of channel-dividing partitions mounted in the hollow interior of the water vessel, spanning between the endwalls, forcing the flow of exhaust air through the process chamber to submerge and re-emerge into and out of the pool of water whereby in a porpoising fashion of submerging and re-emerging.

10. The wet collection apparatus of claim 9 whereby the food product pieces comprise chicken tenders.

11. The wet collection apparatus of claim 9 wherein: the exhaust blower is mounted on and pneumatically-coupled to the closure.

12. The wet collection apparatus of claim 9 wherein: the plurality of channel-dividing partitions comprise, in progression from the inflow-side sidewall to the discharge-side sidewall;

a first nozzle-formed partition conducting a downflow (1) from the vacuum line output that extends between and is pneumatically-coupled to both the food-product coating apparatus and one of the vessel or closure (2) between said first nozzle-formed partition and the inflow-side sidewall;

a first backstop partition;

a second nozzle-formed partition; and a second backstop partition.

13. The wet collection apparatus of claim 12 wherein: all of the partitions have either bottom edges that are not continuously sealed with the bottom wall or are otherwise apertured close to the bottom wall whereby the pool of water can mix freely between the inflow-side sidewall and the discharge-side sidewall.

14. The wet collection apparatus of claim 12 wherein: the first and second nozzle-formed partitions are formed with respective first and second nozzles elevationally closer to the bottom wall than the closure;

the pool of water having a fill line at rest; and the first nozzle is elevationally disposed submerged below the at-rest fill line and submerged in the at-rest pool of water.

15. The wet collection apparatus of claim 14 wherein: the first and second backstop partitions have respective creases elevationally located opposite the first and second nozzles respectively, whereby inducing respective mixing cells/eddies (71 and 72) respectively.

16. The wet collection apparatus of claim 15 wherein: the vessel further comprises a common interior roof elevationally disposed below the open top and spanning between the endwalls and spanning from the first nozzle-formed partition to a termination short of the discharge-side sidewall whereby to leave a flow channel (96) therebetween;

whereby the roof covers the second-nozzle formed partition and the first and second backstop partitions.

17. The wet collection apparatus of claim 16 wherein: the second-nozzle formed partition has an upper edge joined to the roof.

18. The wet collection apparatus of claim 16 wherein: the first and second backstop partitions have respective upper edges that are gapped from the roof.

19. The wet collection apparatus of claim 16 wherein: the second-nozzle formed partition has an upper edge joined to the roof; and the first and second backstop partitions have respective upper edges that are gapped from the roof.

20. The wet collection apparatus of claim 16 wherein: the vessel further comprises an interior shelf elevationally disposed below the open top and elevationally above the interior roof, not only spanning between the endwalls but also spanning from the discharge-side sidewall back over toward the first nozzle-formed partition to a respective termination short of the first nozzle-formed partition, whereby the shelf covers the flow channel (96) and diverts the flow along an underside of the shelf toward the first-nozzle formed partition and then along an upperside the shelf whereby toward ultimate intake by the exhaust blower.

* * * * *